United States Patent
Wu et al.

(10) Patent No.: US 12,315,113 B2
(45) Date of Patent: May 27, 2025

(54) IMAGE PROCESSING METHOD AND APPARATUS, AND STORAGE MEDIUM

(71) Applicant: TENCENT TECHNOLOGY (SHENZHEN) COMPANY LIMITED, Shenzhen (CN)

(72) Inventors: Gao Wu, Shenzhen (CN); Bingkeng Peng, Shenzhen (CN); Nianhua Xie, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 853 days.

(21) Appl. No.: 17/395,861

(22) Filed: Aug. 6, 2021

(65) Prior Publication Data
US 2021/0383176 A1    Dec. 9, 2021

Related U.S. Application Data

(63) Continuation of application No. PCT/CN2020/090055, filed on May 13, 2020.

(30) Foreign Application Priority Data

May 22, 2019  (CN) .......................... 201910429716.6

(51) Int. Cl.
*G06T 5/50*       (2006.01)
*G06F 18/21*      (2023.01)
(Continued)

(52) U.S. Cl.
CPC ................ *G06T 5/50* (2013.01); *G06F 18/21* (2023.01); *G06N 3/08* (2013.01); *G06T 11/00* (2013.01);
(Continued)

(58) Field of Classification Search
CPC ........... G06T 5/50; G06T 11/00; G06V 20/49; G06V 20/46; G06V 10/82; G06V 10/454;
(Continued)

(56) References Cited

U.S. PATENT DOCUMENTS

2004/0215965 A1* 10/2004 Tokuda .............. H04N 1/32309
                                                                713/176
2010/0092085 A1*  4/2010 Marchesotti ............ G06T 11/60
                                                                382/254
(Continued)

FOREIGN PATENT DOCUMENTS

CN        104967885        10/2015
CN        106991641         7/2017
(Continued)

OTHER PUBLICATIONS

Zeng, Yanhong et al., "Learning Pyramid-Context Encoder Network for High-Quality Image Inpainting", Microsoft Research, Beijing, P.R. China.
(Continued)

*Primary Examiner* — Margaret G Webb
(74) *Attorney, Agent, or Firm* — Crowell & Moring LLP

(57) ABSTRACT

Embodiments of the present disclosure disclose an image processing method and apparatus. The method may include obtaining a harmonized image. The harmonized image may be harmonized with a promotional content image. The method may further include performing context feature extraction on the harmonized image to obtain context feature information of the harmonized image and extracting multi-level semantic information of an object in the harmonized image based on the context feature information. The method may further include performing image reconstruction based on the context feature information and the multi-level
(Continued)

semantic information to obtain a reconstructed image. This solution can improve an image harmonization effect.

18 Claims, 7 Drawing Sheets

(51) Int. Cl.
*G06N 3/08* (2023.01)
*G06T 11/00* (2006.01)
*G06V 10/44* (2022.01)
*G06V 10/82* (2022.01)
*G06V 20/40* (2022.01)
*G06V 30/19* (2022.01)
*G06V 30/262* (2022.01)

(52) U.S. Cl.
CPC ............ *G06V 10/454* (2022.01); *G06V 10/82* (2022.01); *G06V 20/41* (2022.01); *G06V 20/46* (2022.01); *G06V 20/49* (2022.01); *G06V 30/19173* (2022.01); *G06V 30/274* (2022.01)

(58) Field of Classification Search
CPC . G06V 20/41; G06V 30/274; G06V 30/19173
See application file for complete search history.

(56) References Cited

U.S. PATENT DOCUMENTS

2020/0364515 A1* 11/2020 Heide ................... G06N 3/084
2021/0342976 A1* 11/2021 Navarrete Michelini ...................
G06T 3/4076

FOREIGN PATENT DOCUMENTS

| CN | 107169135 | 9/2017 |
|---|---|---|
| CN | 108573527 | 9/2018 |
| CN | 108830322 A | 11/2018 |
| CN | 109685072 | 4/2019 |

OTHER PUBLICATIONS

European Office Action and Search Report issued on application EP20810620.3 on Jul. 5, 2022, 12 pages.
Chang, Chia-Hu et al., "Virtual spotlighted advertising for tennis videos", J. Vis. Commun. Image R. 21 (2010) 595-612.
Tsai, Yi-Hsuan et al., "Deep Image Harmonization", 2017 IEEE Conference on Computer Vision and Pattern Recognition, 9 pages.
English translation of International Search Report issued Aug. 12, 2020 in International Application No. PCT/CN2020/090055.
Fei et al. "A Convolutional Encoder-Decoder Network with Skip Connections for Saliency Prediction," IEEE Access, May 2019 7:60428-60438.
Office action issued in European application No. 20810620.3, dated Nov. 26, 2024, 9 pages.

* cited by examiner

IMAGE PROCESSING METHOD AND APPARATUS, AND STORAGE MEDIUM

CROSS-REFERENCE TO RELATED APPLICATION

The present disclosure is a continuation application of PCT Patent Application No. PCT/CN2020/090055, filed on May 13, 2020, which claims priority to Chinese Patent Application No. 201910429716.6, entitled "IMAGE PROCESSING METHOD AND APPARATUS, COMPUTER DEVICE, AND STORAGE MEDIUM" and filed on May 22, 2019, wherein the content of each of the above-referenced applications is incorporated herein by reference in its entirety.

FIELD OF THE TECHNOLOGY

The present disclosure relates to the field of image technologies, and specifically, to an image processing method and apparatus, a computer device, and a storage medium.

BACKGROUND OF THE DISCLOSURE

Image harmonization is an image processing technology with which a target image is harmonized to a source image. The target image may be a promotional content image and the like. Currently, the image harmonization technology is widely applied in many fields, for example, video advertisement placement. Video advertisement placement is to perform secondary content creation on a shot video by using the image harmonization technology, and naturally place an advertisement into the original video. Briefly, video advertisement placement is to find a video frame suitable for placing an advertisement position in massive existing short videos, films, and television programs, and insert a suitable advertisement by using the image harmonization technology. Video advertisement placement enables a plurality of different advertisements to be placed into the same video scenario, and the advertisements can be placed at any time after a video is shot.

SUMMARY

Embodiments of the present disclosure provide an image processing method and apparatus, a computer device, and a storage medium. The following describes these technical solutions one by one.

An embodiment of the present disclosure provides an image processing method. The method may include obtaining a harmonized image. The harmonized image may be harmonized with a promotional content image. The method may further include performing context feature extraction on the harmonized image to obtain context feature information of the harmonized image and extracting multi-level semantic information of an object in the harmonized image based on the context feature information. The method may further include performing image reconstruction based on the context feature information and the multi-level semantic information to obtain a reconstructed image.

Correspondingly, an embodiment of the present disclosure further provides an image processing apparatus. The image processing apparatus may include a memory operable to store computer-readable instructions and a processor operable to read the computer-readable instructions. The processor when executing the computer-readable instructions may be configured to obtain a harmonized image being harmonized with a promotional content image and perform context feature extraction on the harmonized image to obtain context feature information of the harmonized image. The processor may be configured to extract multi-level semantic information of an object in the harmonized image based on the context feature information and perform image reconstruction based on the context feature information and the multi-level semantic information to obtain a reconstructed image.

An embodiment of the present disclosure further provides a computer device, including a memory, a processor, and a computer program stored in the memory and executable on the processor, the processor, when executing the program, performing the operations of any image processing method provided in the embodiments of the present disclosure.

In addition, an embodiment of the present disclosure further provides a non-transitory computer-readable storage medium having processor executable instructions stored thereon. The instructions may cause a processor to obtain a harmonized image being harmonized with a promotional content image and perform context feature extraction on the harmonized image to obtain context feature information of the harmonized image. The instructions may further cause the processor to extract multi-level semantic information of an object in the harmonized image based on the context feature information and perform image reconstruction based on the context feature information and the multi-level semantic information to obtain a reconstructed image.

BRIEF DESCRIPTION OF THE DRAWINGS

To describe the technical solutions in embodiments of the present disclosure more clearly, the following briefly describes accompanying drawings required for describing the embodiments. Apparently, the accompanying drawings in the following description show merely some embodiments of the present disclosure, and a person skilled in the art can still derive other drawings from these accompanying drawings without creative efforts.

DESCRIPTION OF EMBODIMENTS

The following clearly and completely describes the technical solutions in embodiments of the present disclosure with reference to accompanying drawings in the embodiments of the present disclosure. Apparently, the described embodiments are merely some but not all of the embodiments of the present disclosure. All other embodiments obtained by a person skilled in the art based on the embodiments of the present disclosure without creative efforts shall fall within the protection scope of the present disclosure.

In the related art, a current image harmonization solution is used. Especially, when a target image and a source image greatly differ (for example, in color and texture), after the target image is harmonized to the source image, the target image in the harmonized image does not fit well with the source image, and a harmonization effect is relatively low. For example, an advertisement is placed into a video by using the current image harmonization solution. If contents of the advertisement and the video greatly differ, after the advertisement is harmonized to a video frame, the harmonized video frame does not fit well.

The embodiments of the present disclosure provide an image processing method and apparatus, a computer device, and a storage medium. The image processing apparatus may be integrated in a computer device, and the computer device may be a server, a terminal, or another image processing device having an image processing capability. For example, the terminal may be a mobile phone, a tablet computer, or a notebook computer.

Image processing related to the embodiments of the present disclosure may include processing on a harmonized image, for example, adjusting image parameters such color, brightness, and saturation of the harmonized image.

Figure 1:
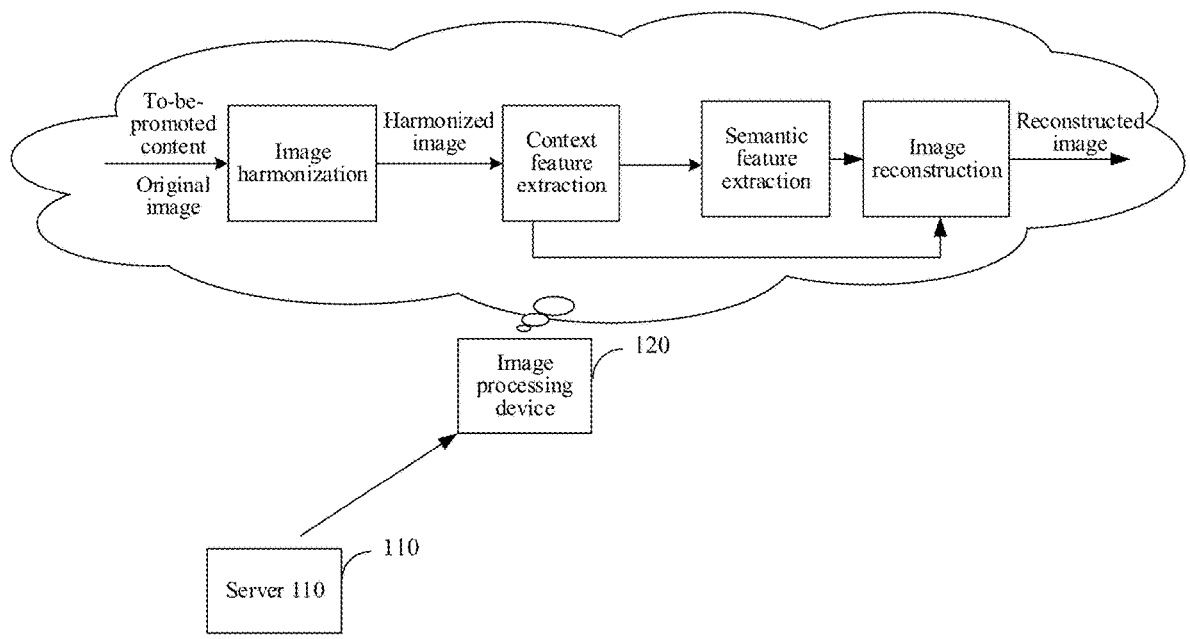
FIG. 1 is a schematic diagram showing a scenario of an image processing method according to an embodiment of the present disclosure.

Referring to FIG. 1, an example in which the computer device is an image processing device is used. The embodiments of the present disclosure provide an image processing system, including a server 110, an image processing device 120, and the like. The image processing device 120 and the server 110 are connected by using a network, for example, by using a wired network or a wireless network. The server 110 may be configured to transmit an original image to the image processing device 120, so that the image processing device 120 processes the image. For example, the server 110 may transmit a video or a photo to the image processing device 120.

The image processing device 120 may be configured to process an image. For example, the image processing device 120 harmonizes a promotional content image to the original image, and then performs image processing on a harmonized image, to adjust an effect of the harmonized image, so that the promotional content image fits better with the original image. Specifically, the image processing device 120 may perform context feature extraction on a harmonized image (that is, the harmonized image), to obtain context feature information of the harmonized image; extract multi-level semantic information of an object in the harmonized image based on the context feature information; and perform image reconstruction based on the context feature information and the multi-level semantic information, to obtain a reconstructed image.

In an exemplary scenario, the embodiments of the present disclosure may be applied to a video advertisement placement scenario. An example in which a promotional content image is an advertisement image is used. In this case, the harmonized image may be a video frame harmonized with an advertisement image in a video. The image processing device performs image processing on the video frame harmonized with the advertisement image, to prevent the advertisement image from producing an abrupt visual effect in the video frame. In this way, the advertisement image fits better with the video frame, which improves an image harmonization effect of the video advertisement placement.

In an exemplary scenario, the embodiments of the present disclosure may be applied to a social scenario in which an expression is inserted into a photo. In this case, the harmonized image may be a photo harmonized with an expression, and the promotional content image is the expression. The image processing device performs image processing on the photo harmonized with the expression, to prevent the expression from producing an abrupt visual effect in the photo. In this way, the inserted expression fits better with the original photo, which improves an image harmonization effect in insertion of the expression into the photo.

In addition, to ensure that a style, color, and the like of the promotional content image remain unchanged, and improve a promotion effect, the image processing device may further determine a harmonized region in the reconstructed image, and replace an image of the harmonized region in the reconstructed image with the promotional content image, to obtain an image after the replacement.

The following provides detailed descriptions. The description sequence of the following embodiments is not intended to limit optional orders of the embodiments.

Descriptions are made from a perspective of an image processing apparatus in the embodiments. The image processing apparatus may be specifically integrated into a computer device, for example, an image processing device.

Figure 2:
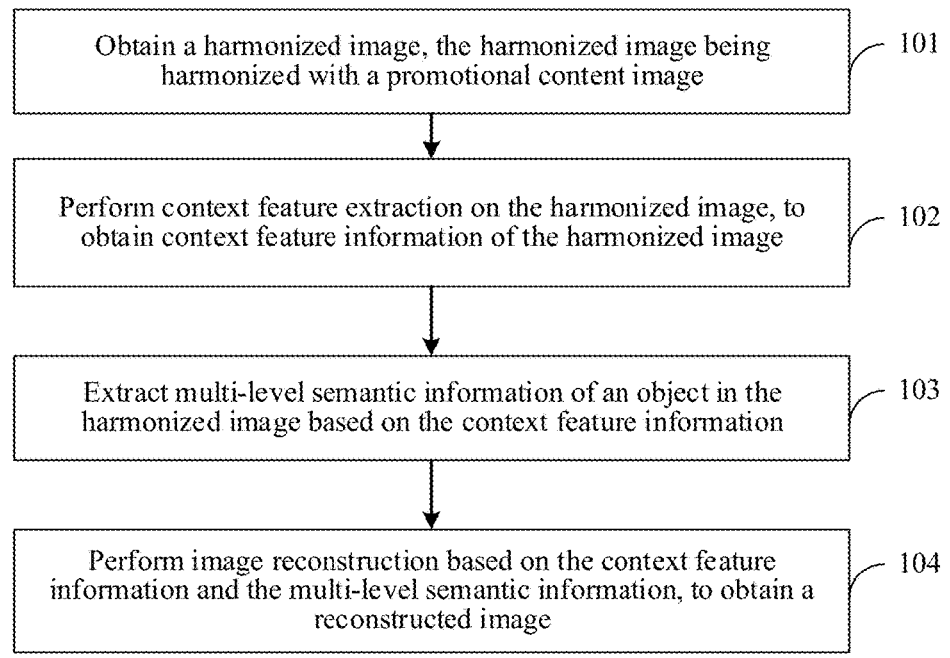
FIG. 2 is a flowchart of an image processing method according to an embodiment of the present disclosure.

An embodiment of the present disclosure provides an image processing method. The method may be performed by a processor of an image processing device. As shown in FIG. 2, a specific process of the image processing method may be as follows:

101: The image processing device obtains a harmonized image, the harmonized image being harmonized with a promotional content image.

The harmonized image may be an image that needs to be processed currently and that is harmonized with the promotional content image. The harmonized image may be in a plurality of forms, for example, an independent image. In another example, the harmonized image may be a video frame in a video.

The promotional content image may be an image including contents such as an advertisement, an expression, and an article. The following describes the image processing method of the present disclosure by using an example in which a promotional content is an advertisement.

In an embodiment, the harmonized image may be a video frame harmonized with a promotional content image, and a process of obtaining the harmonized image by the image processing device may include:
  splitting a video, to obtain at least one video frame;
  determining a target video frame in the at least one video frame;
  harmonizing the promotional content image to a harmonized region of the target video frame, to obtain a harmonized video frame; and
  using the harmonized video frame as the harmonized image.

For example, after obtaining a video, the image processing device may split the video into several video frames; select, from the video frames, a target video frame that needs to be harmonized with a promotional content; determine a harmonized region in the target video frame; and harmonize (for example, insert or paste) a promotional content image, for example, an advertisement image, into the harmonized region.

102: The image processing device performs context feature extraction on the harmonized image, to obtain context feature information of the harmonized image.

The context feature information of the image may represent overall structural information of the image and context semantic information of the image surrounding the harmonized region. The overall structural information of the image may be pixel-level underlying features, and may relate to an overall color feature of the image, for example, a video frame, an overall texture feature of the image, an overall space layout feature of the image, and the like. The context semantic information may be harmonized with image features such as a color feature, a texture feature, brightness, and saturation of the image surrounding the harmonized region. In an embodiment, the context feature information may be represented by a vector. That is, the context feature information may be a context feature vector.

The context feature information may include multi-layer context features, that is, a plurality of levels of context features. Each level of context feature information is an expression of overall structural information of the image and context semantic information of the image surrounding the harmonized region at a different level or hierarchy.

For example, the multi-layer context features may include a high-level context feature and a bottom-level context feature. Levels of context features may be obtained through classification based on semantics of image features. A context feature of a higher level includes semantic information of a higher level. A context feature of a level in the multi-layer context features is extracted from a context feature of a previous level of the context feature of the level, that is, abstracted from the context feature of the previous level.

In actual application, when features are extracted by using a convolutional neural network, each level of context features is are outputted features of each convolutional layer. A highest-level context feature is a context feature outputted by an output convolutional layer, and may be referred to as an output-layer context feature; and a context feature of another level may be referred to as a middle-layer context feature.

For example, in an embodiment, context feature extraction may be performed on the harmonized image level by level, to obtain the multi-layer context features of the harmonized image.

To improve efficiency and accuracy in feature extraction, in this embodiment of the present disclosure, the multi-layer context features of the image may be extracted by using a convolutional neural network. The convolutional neural network may include a plurality of convolutional layers. Each convolutional layer performs a convolutional operation to extract image features from a bottom level to a high level. Each convolutional layer corresponds to one level of image features, and is used for performing a convolutional operation to extract image features of a higher level from image features of a previous level.

Specifically, the step of performing context feature extraction on the harmonized image, to obtain context feature information of the harmonized image may include:
  performing the context feature extraction on the harmonized image by using a plurality of convolutional layers in a first convolutional neural network, to obtain multi-layer context features of the harmonized image.

Each level of context features may have a different size. Generally, a size of a high-level context feature is less than that of a bottom-level context feature. For example, sizes of features from a bottom level to a high level decrease sequentially.

Figure 3:
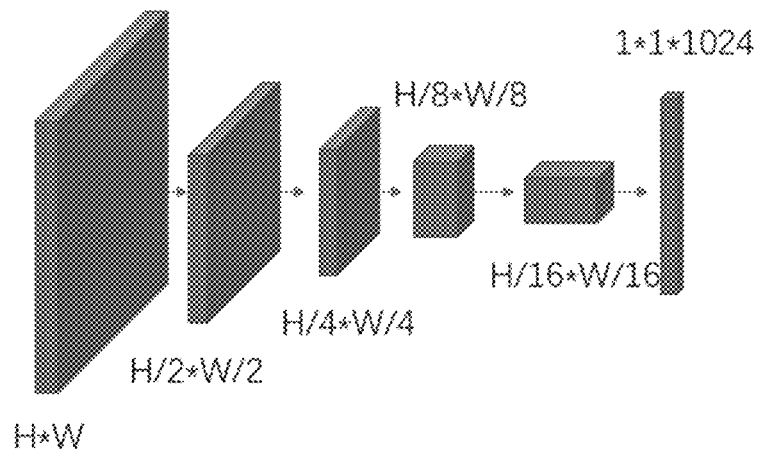
FIG. 3 is a schematic structural diagram of a convolutional neural network according to an embodiment of the present disclosure.

In this embodiment of the present disclosure, the convolutional layers in the convolutional neural network correspond to levels and sizes of features, for example, in a pyramid shape shown in FIG. 3.

There may be a plurality of types of convolutional neural networks. For example, to improve the accuracy in feature extraction, the feature extraction may be implemented by using a downsampling convolutional neural network, where the downsampling convolutional neural network may include a plurality of downsampling convolutional layers.

For example, referring to FIG. 3, the downsampling convolutional neural network may include a context encoder. The context encoder includes downsampling convolutional layers of a plurality of sizes, for example, an H (height)×W (width) convolutional layer, an H/2×W/2 convolutional layer, an H/4×W/4 convolutional layer, . . . , and a 1×1 convolutional layer.

After the harmonized image is inputted into the encoder, convolutional processing is performed on the harmonized image at the H (height)×W (width) convolutional layer, to extract a bottom-level context feature of the image, and the extracted feature is inputted into the H/2×W/2 convolutional layer; convolutional processing (for example, a downsampling convolutional operation with a stride of 2) is performed on the inputted feature at the H/2×W/2 convolutional layer, to extract a context feature of a higher level. The rest is deduced by analogy until the 1×1 convolutional layer outputs a vector feature (that is, an output-layer context feature) having a size of 1×1×1024. Image context features are context feature representations (representations in a vector form) of the image, and may be understood as overall structural information of the entire image and context semantic information of the image surrounding the harmonized region.

103: The image processing device extracts multi-level semantic information of an object in the harmonized image based on the context feature information.

Semantic information of the image may be used for recognizing, explaining, and understanding information of the object in the image, and may be divided into semantic information of a plurality of levels such as a visual level, an object level, and a concept level. The object level is generally understood as a bottom level, that is, color, texture, a shape, and the like. These features are all referred to as bottom-level feature semantics. The object level is a middle level, and generally contains an attribute feature and the like, which is a state of an object at a time point. The concept level is a high level, and is a thing expressed by the image that is closest to human understanding.

In this embodiment of the present disclosure, the image processing device may extract multi-level semantic information of the object in the harmonized image based on the context feature information. Specifically, the image processing device may extract the multi-level semantic information of the object in the harmonized image based on the multi-layer context features of the harmonized image.

There may be a plurality of manners of extracting the multi-level semantic information based on the multi-layer context features. For example, the multi-level semantic information may be obtained by clustering the multi-layer context features. In another example, in an embodiment, when the multi-layer context features may include an output-layer context feature and a middle-layer context feature, semantic extraction may be performed on the output-layer context feature, and extracted semantic information and a middle-layer context feature at the same level are harmonized. In this way, the multi-level semantic information can be obtained.

For example, the step of extracting the multi-level semantic information of the object in the harmonized image based on the multi-layer context features of the harmonized image may include:

performing multi-level semantic extraction on the output-layer context feature, and harmonizing extracted semantic information with a middle-layer context feature at the same level, to obtain the multi-level semantic information of the object in the harmonized image.

The output-layer context feature may be a finally outputted context feature, and is generally a highest-level context feature. When features are extracted by using a convolutional neural network, the output-layer context feature is a feature outputted by a highest-level convolutional layer or a last convolutional layer in the convolutional neural network. The middle-layer context feature is a context feature in the multi-layer context features other than the output-layer context feature, and may be a feature outputted by a convolutional layer other than a last convolutional layer when features are extracted by using a convolutional neural network.

In an embodiment, to improve efficiency in context feature extraction, the step of performing multi-level semantic extraction on the output-layer context feature, and harmonizing extracted semantic information with a middle-layer context feature at the same level may include:

determining the output-layer context feature as a current extraction feature;
performing semantic extraction on the current extraction feature, to obtain target-level semantic information of the object in the harmonized image;
harmonizing the target-level semantic information with a middle-layer context feature at the same level, to obtain a target-level harmonized feature of the object in the harmonized image;
updating a current input feature to the target-level harmonized feature; and
returning, when a semantic extraction termination condition is not met (that is, in a case that a semantic extraction termination condition is not met), to perform the step of performing semantic extraction on the current extraction feature; or outputting the multi-level semantic information of the object in the harmonized image when a semantic extraction termination condition is met (that is, in a case that a semantic extraction termination condition is met).

The semantic extraction termination condition may be a condition for stopping the semantic extraction. The condition may be set as required. For example, the condition may be that a level of a currently extracted semantic feature is a preset level. In another example, when semantic features are extracted by using a convolutional neural network, the semantic extraction termination condition is that a current convolutional layer is a last layer.

In an embodiment, to improve accuracy and efficiency in semantic information extraction, semantic features may be extracted by using a convolutional operation. For example, semantic information may be extracted by using a plurality of convolutional layers.

For example, to simplify the structure of the network, semantic information may be extracted by using an encoding module (encoder) in the first convolutional neural network. In this case, the first convolutional neural network may be referred to as a semantic extraction network, a semantic segmentation network, or the like.

In other words, in this embodiment of the present disclosure, the encoding module in the convolutional neural network, for example, a semantic segmentation network, may be used for both the context feature extraction and the semantic feature extraction, thereby simplifying the structure of the network, and saving resources.

Specifically, the first convolutional neural network in this embodiment of the present disclosure may include an encoding module and a decoding module, the encoding module including a plurality of encoding convolutional layers, and the decoding module including a plurality of decoding convolutional layers in skip connections with the plurality of encoding convolutional layers respectively. The encoding convolutional layers and the decoding convolutional layers are convolutional layers used for feature extraction, and are the same as common convolutional layers. In this embodiment of the present disclosure, the encoding convolutional layers and the decoding convolutional layers are merely for a distinguishing purpose.

For example, a specific process of performing multi-level semantic extraction on the output-layer context feature, and harmonizing extracted semantic information with a middle-layer context feature at the same level includes:

for any one of the plurality of decoding convolutional layers, performing, by using the decoding convolutional layer, semantic extraction on a feature outputted by a previous layer; and
harmonizing an extracted semantic feature and a middle-layer context feature at the same level, the middle-layer context feature at the same level being a middle-layer context feature outputted by an encoding convolutional layer in a skip connection with the decoding convolutional layer.

Figure 4:
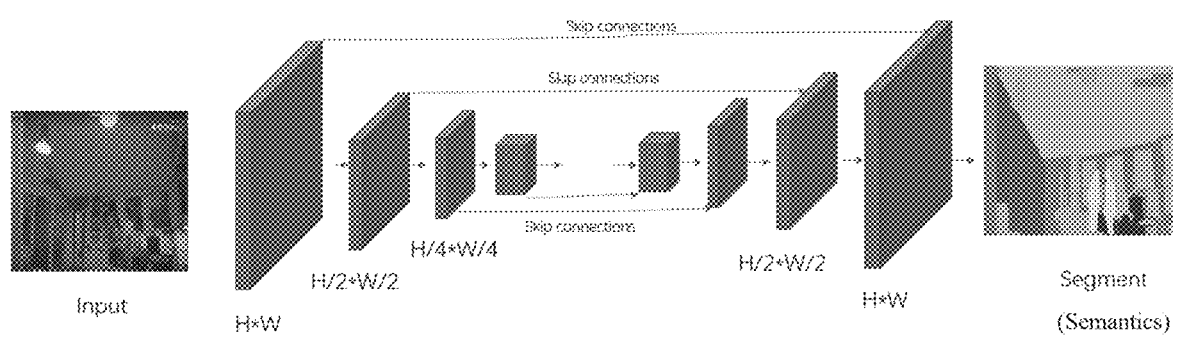
FIG. 4 is a schematic structural diagram of a semantic segmentation network according to an embodiment of the present disclosure.

For example, referring to FIG. 4, an example in which the convolutional neural network is a downsampling convolutional neural network is used. The downsampling convolutional neural network may include a context encoder and a decoder. The context encoder includes a plurality of downsampling convolutional layers whose sizes decrease sequentially. For example, the encoder is a pyramid layered network, and includes, for example, an H (height)×W (width)

convolutional layer, an H/2×W/2 convolutional layer, an H/4×W/4 convolutional layer, . . . , and a 1×1 convolutional layer.

The decoder includes a plurality of downsampling convolutional layers whose sizes increase sequentially. For example, the decoder is an inverted pyramid layered network, and specifically includes an H/4×W/4 convolutional layer, an H/2×W/2 convolutional layer, an H (height)×W (width) convolutional layer, and the like. Convolutional layers in the encoder are in skip connections with corresponding convolutional layers in the decoder, for example, convolutional layers at the same level or the same size. For example, an H (height)×W (width) convolutional layer in the decoder is in a skip connection with an H (height)×W (width) convolutional layer in the encoder, and an H/2×W/2 convolutional layer in the decoder is in a skip connection with an H/2×W/2 convolutional layer in the encoder.

Context feature extraction is described as follows: After the harmonized image is inputted into the encoder, convolutional processing is performed on the harmonized image at the H (height)×W (width) convolutional layer, to extract a bottom-level context feature of the image, and the extracted feature is inputted into the H/2×W/2 convolutional layer; convolutional processing (for example, a downsampling convolutional operation with a stride of 2) is performed on the inputted feature at the H/2×W/2 convolutional layer, to extract a context feature of a higher level, and so on. The rest is deduced by analogy until the 1×1 convolutional layer outputs a vector feature (that is, an output-layer context feature) having a size of 1×1×1024.

Semantic extraction on the object, for example, a thing, is described as follows: The vector feature of 1×1×1024 is inputted into the decoder, and a convolutional operation is performed on the vector feature of 1×1×1024 at an H/8×W/8 convolutional layer, to extract semantic information of a size of H/8×W/8; the extracted semantic information and a context feature outputted by the H/8×W/8 convolutional layer of the encoder, that is, a context feature of a size of H/8×W/8 (a context feature at the same level), are harmonized, and a harmonized feature is inputted into a next layer, that is, an H/4×W/4 convolutional layer; a convolutional operation is performed on the inputted feature at the H/4×W/4 convolutional layer, to extract semantic information of a size of H/4×W/4; and the extracted semantic information and a context feature outputted by the H/4×W/4 convolutional layer of the encoder, that is, a context feature of a size of H/4×W/4 (a context feature at the same level), are harmonized, and a harmonized feature is inputted into next layer, that is, an H/2×W/2 convolutional layer, and so on. The rest is deduced by analogy until an H×W convolutional layer harmonizes H×W semantic information outputted by the H×W convolutional layer with an H×W context feature. In this way, the multi-level semantic information of the object in the image can be extracted.

In this embodiment of the present disclosure, considering that in a process executed by the encoder, the entire image is represented by a vector, causing a loss in semantic information of the image. Consequently, an effect in a subsequent image reconstruction process is below expectations. Therefore, a semantic extraction network (semantic segmentation model) is added, to capture different levels of semantics of the image, for example, a video source image, and transmit the semantic information to a decoder part for image reconstruction, so that more semantic information of a source video can be obtained during reconstruction, and the reconstruction is more natural, thereby greatly improving an image harmonization effect.

104: The image processing device performs image reconstruction based on the context feature information and the multi-level semantic information, to obtain a reconstructed image.

Image reconstruction refers to image restoration, or constructing and generating an image again, for example, restoring an image based on some feature information and/or semantic information. In this embodiment of the present disclosure, context features and semantic information may be extracted from the harmonized image, and then a harmonized image is reconstructed based on the context features and the semantic information.

In an embodiment, the image reconstruction may be performed based on the multi-layer context features and the multi-level semantic information, to obtain the reconstructed image.

In this embodiment of the present disclosure, to make a promotional content image of the reconstructed image fit with an original image in features such as color and brightness, to improve an image harmonization effect, the multi-level semantic information may be harmonized to the image reconstruction process. Specifically, multi-level feature restoration is performed on the output-layer context feature, and semantic information and a restored feature at the same level are harmonized, to obtain the reconstructed image.

For example, multi-level feature restoration is performed on the output-layer context feature outputted by the encoder in the first convolutional neural network, and semantic information and a restored feature at the same level are harmonized. For example, after the context feature vector and multi-level semantic distribution information of the image are extracted by using the convolutional neural network shown in FIG. 4, feature restoration is performed on the context feature vector level by level, and semantic information and a restored feature at the same level are harmonized, to obtain a reconstructed image.

For example, in an embodiment, the image reconstruction process may include:
determining the output-layer context feature as a current restoration feature;
performing feature restoration on the current restoration feature, to obtain a restored feature;
harmonizing the restored feature and semantic information at the same level, to obtain a harmonized feature;
updating the current restoration feature to the harmonized feature; and
returning, when a reconstruction termination condition is not met (that is, in a case that a reconstruction termination condition is not met), to perform the steps of performing feature restoration on the current restoration feature; or
outputting the current restoration feature when a reconstruction termination condition is met (that is, in a case that a reconstruction termination condition is met), to obtain the reconstructed image.

The reconstruction termination condition is a condition for stopping the feature restoration. The condition may be set as required. The condition may be, for example, stopping reconstruction when a size or a level of a currently restored feature is a preset size or a preset level, or stopping reconstruction when a convolutional layer that performs a convolutional operation is a preset convolutional layer, for example, a last layer, in a case that an image is reconstructed by using a convolutional neural network.

In an embodiment, to improve efficiency and accuracy in feature restoration so as to improve a harmonization effect of the reconstructed image, image reconstruction may be implemented by using a convolutional neural network.

Specifically, the step of performing the image reconstruction based on the multi-layer context features and the multi-level semantic information, to obtain the reconstructed image may include:

inputting the output-layer context feature into a second convolutional neural network, the second convolutional neural network including a plurality of convolutional layers; and performing, by using a convolutional layer in the second convolutional neural network, feature restoration on a feature outputted by a previous layer, harmonizing a restored feature with semantic information at the same level, and inputting the harmonized feature into a next convolutional layer, to obtain the reconstructed image.

In an embodiment, the semantic information and the restored feature at the same level may be semantic information and a restored feature of the same size. In other words, sizes correspond to levels.

In this embodiment of the present disclosure, there are a plurality of manners of feature harmonization, such as feature splicing and feature value summation, for example, performing harmonization in an element-wise sum manner.

Figure 5:
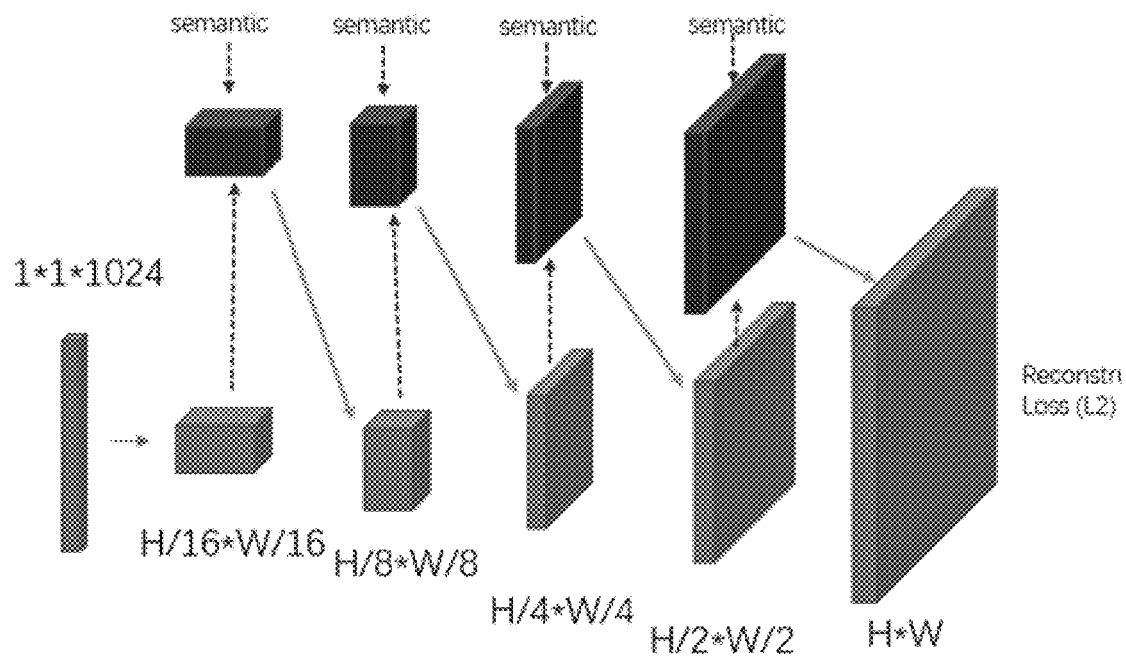
FIG. 5 is a schematic diagram of image reconstruction according to an embodiment of the present disclosure.

For example, referring to FIG. 5, another convolutional neural network (referred to as a second convolutional neural network) is provided. The convolutional neural network includes a plurality of convolutional layers whose sizes increase sequentially. For example, the convolutional neural network includes an H/4×W/4 convolutional layer, an H/2×W/2 convolutional layer, and an H (height)×W (width) convolutional layer. The convolutional neural network is an inverted pyramid layered reconstruction network. In actual application, the second convolutional neural network may be regarded as a decoder corresponding to the encoder in the first convolutional neural network.

The convolutional neural network may be an upsampling convolutional neural network. Each convolutional layer of the convolutional neural network performs an upsampling convolutional operation of a particular stride.

An image reconstruction process is as follows: A vector feature of 1×1×1024 extracted by the encoder in FIG. 4 is inputted into the second convolutional neural network, that is, the decoder, and an upsampling convolutional operation is performed on the vector feature of 1×1×1024 at an H/16×W/16 convolutional layer, to restore a feature map of a size of H/16×W/16; and semantic information of a size of H/16×W/16 and the feature map of a size of H/16×W/16 are harmonized, and a harmonized feature map is inputted into a next convolutional layer, that is, an H/8×W/8 convolutional layer.

Figure 6:
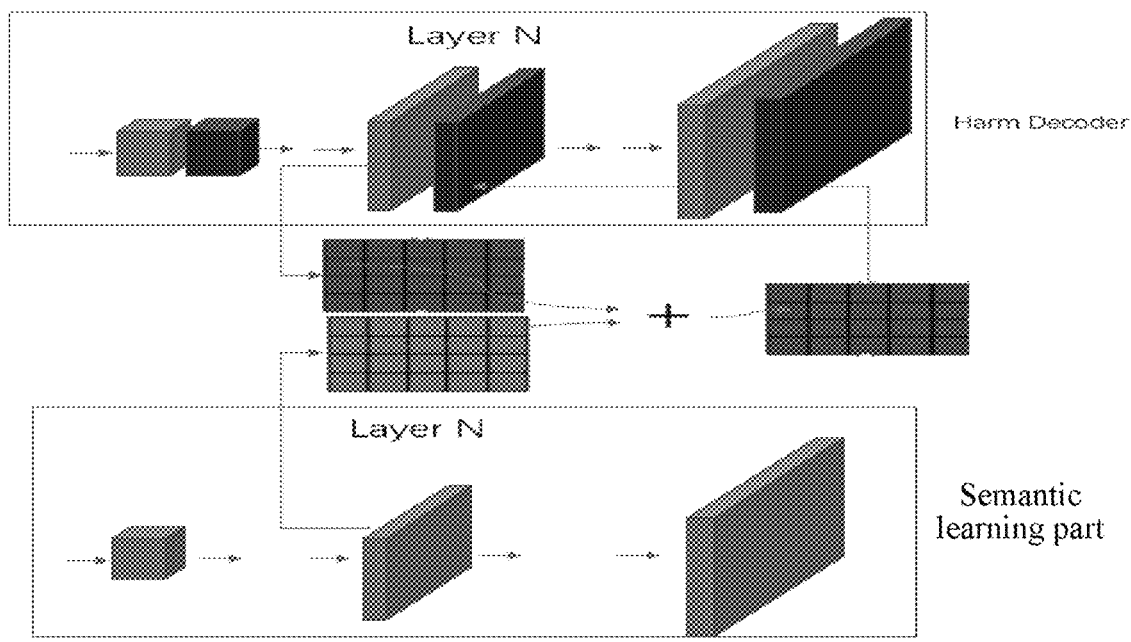
FIG. 6 is a schematic diagram of harmonizing semantic information through summation according to an embodiment of the present disclosure.

A feature and semantic information may be harmonized in an element-wise sum manner. Referring to FIG. 6, semantic information and restored features that are outputted by convolutional layers of the same size in a semantic learning encoder and a harm decoder may be harmonized in an element-wise sum manner, and a harmonized feature is inputted into a next layer. Specifically, element-wise summation is performed on a semantic feature matrix and a feature matrix corresponding to a restored feature map that are outputted by convolutional layers of the same size.

For example, element-wise summation may be performed on a feature matrix corresponding to an H/16×W/16 feature map and a semantic feature matrix of H/16×W/16 semantic information.

Similarly, an upsampling convolutional operation is performed on a harmonized H/16×W/16 restored feature map at an H/8×W/8 convolutional layer, to restore a feature map of a size of H/8×W/8; and semantic information of a size of H/8×W/8 and the feature map of a size of H/8×W/8 are harmonized, and a harmonized feature map is inputted into a next convolutional layer, that is, an H/4×W/4 convolutional layer.

The rest is deduced by analogy, and the same operation is performed at the H/4×W/4 convolutional layer, an H/2×W/2 convolutional layer, and an H×W convolutional layer. Finally, the image is restored, that is, the image is reconstructed.

In this embodiment of the present disclosure, in the image reconstruction part, a harmonized region is reconstructed by using an upsampling convolutional network with reference to context feature representations (image context features) and an output of a semantic learning part. During reconstruction, upsampling feature restoration is performed at each layer, and semantic distribution information of a segmentation model is added. Therefore, both a color distribution of a reconstructed object and color information of another object within a receptive field are taken into consideration during the construction. In this way, a promotional image fits better with a source image in aspects, for example, color, which greatly improves an image harmonization effect.

In an embodiment, after the promotional content image is harmonized to the source image, the promotional content image changes greatly, for example, in style and color, and stability of the promotional content image is relatively low, which does not meet a promotion requirement. For example, when an advertisement is harmonized into a video, color, texture, and the like of the advertisement approximate those of a target video. Especially, when contents of the advertisement and the video greatly differ, the advertisement becomes completely different, which cannot be accepted by an advertiser.

Therefore, to improve stability of the promotional content image, after the image is reconstructed, a reconstructed promotional content image in the harmonized region may be replaced with the original promotional content image.

For example, the image processing method in this embodiment of the present disclosure further includes:

determining a harmonized region in the reconstructed image; and replacing an image of the harmonized region in the reconstructed image with the promotional content image, to obtain an image after the replacement.

For example, position information of the harmonized region may be recorded after the promotional content image is harmonized. In this case, the harmonized region may be determined according to the position information, and then the reconstructed promotional content image in the harmonized region is replaced with the original promotional content image.

The method provided in this embodiment of the present disclosure may be applied to various image harmonization scenarios, such as a scenario in which an advertisement or the like is placed into a video frame, and a scenario in which an expression, text, a picture, or the like is inserted into a photo.

As can be learned from the above, in this embodiment of the present disclosure, a harmonized image may be obtained, the harmonized image being harmonized with a promotional content image; context feature extraction is performed on the harmonized image, to obtain context feature information of the harmonized image; multi-level semantic information of an object in the harmonized image is extracted based on the context feature information; and image reconstruction is performed based on the context feature information and the multi-level semantic information, to obtain a reconstructed image. By means of the solution, based on context feature information and semantic information of the harmonized image, a harmonized image can be reconstructed, that is, the harmonized image is readjusted. Therefore, adaptive adjustment of a promotional content image when being harmonized into source images from different scenarios can be implemented, and image features such as texture, color, and brightness of the promotional content image are automatically adjusted according to differences between harmonized source images. In this way, the promotional content image fits well with the source images in aspects, for example, a color distribution, which greatly improves an image harmonization effect.

According to the method described in the foregoing embodiments, the following further provides detailed descriptions by using examples.

In this embodiment, descriptions are provided by using an example in which the image processing apparatus is specifically integrated into an image processing device.

(1) A semantic segmentation network and an image reconstruction network are separately trained, and details may be as follows:

1. Training on the Semantic Segmentation Network.

The semantic segmentation network may include an encoder and a decoder. For a specific structure of the semantic segmentation network, refer to the foregoing descriptions.

First, the computer device, for example, an image processing device, may obtain a training set of the semantic segmentation network. The training set includes sample images marked with pixel types (for example, a foreground pixel and a background pixel).

The image processing device may train the semantic segmentation network based on the training set and a loss function. Specifically, semantic segmentation may be performed on the sample images by using the semantic segmentation network, to obtain pixel types of the sample images; and then the pixel types obtained through the segmentation and the marked pixel types are converged based on the loss function, to obtain a trained semantic segmentation network.

2. Training on the Image Reconstruction Network.

The image reconstruction network is a convolutional neural network (CNN), that is, the second convolutional neural network described above. The network may be regarded as a decoder, and a structure of the decoder is the same as that of a decoder in the semantic segmentation network. Quantities of layers included in the two structures are the same, and H, W, C (quantities of channels) of each layer are the same.

The computer device, for example, an image processing device, may be configured to train a training set of the image reconstruction network. The training set includes sample images. Convergence training is performed on the image reconstruction network by using the training set and a loss function. Specifically, an RGB L2 loss function is used for controlling the reconstructed image to be close to Ground Truth as much as possible. For details, refer to a description on the loss function below:

The following is a formula of the loss function used for reconstruction:

$$\text{Loss} = \sum_{i=0}^{h*w*c} |\text{R\_Im} g_i - GT_i|^2$$

where i represents a subscript of the image, and by using an RGB 3 channel picture as an example, a total quantity of elements is h×w×c.

(2) The image can be reconstructed by using the trained semantic segmentation network and the trained image reconstruction network, to adjust an image harmonization effect. For details, refer to FIG. 7 and FIG. 8.

Figure 7:
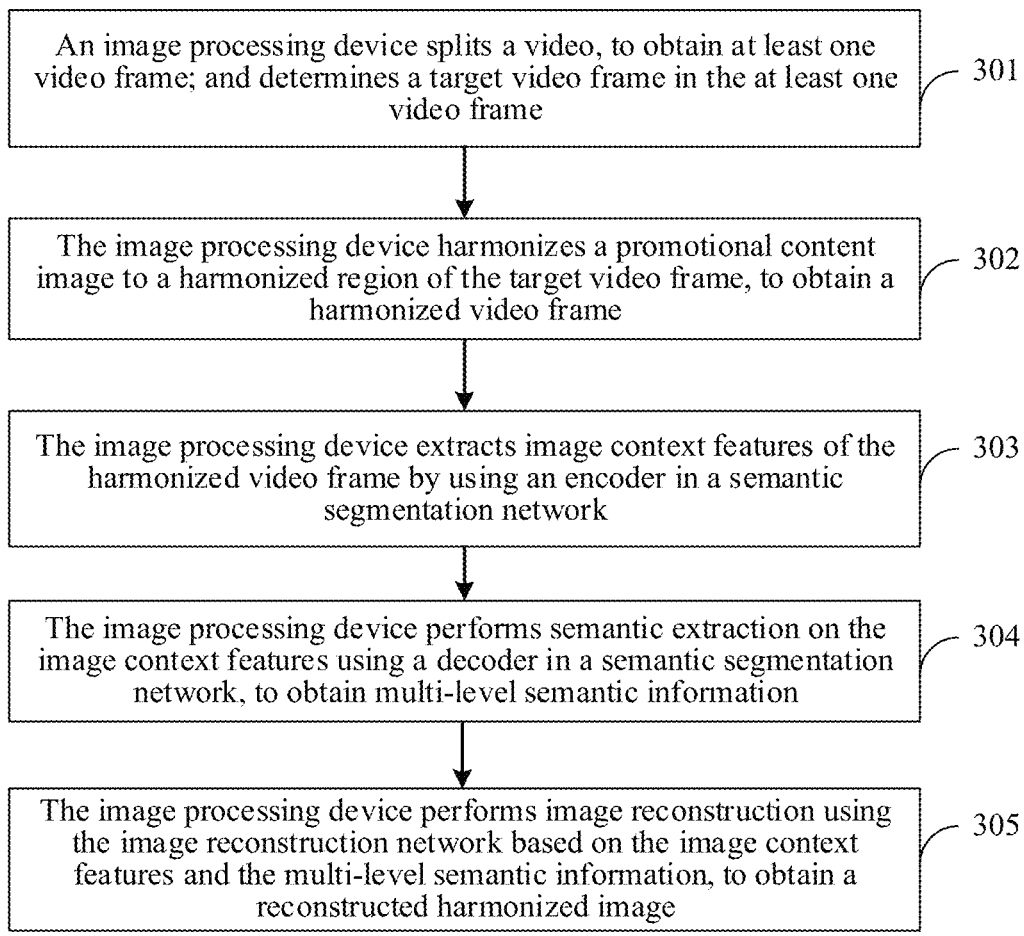
FIG. 7 is another schematic flowchart of an image processing method according to an embodiment of the present disclosure.

As shown in FIG. 7, a specific process of an image processing method may be as follows:

301: An image processing device splits a video, to obtain at least one video frame; and determines a target video frame in the at least one video frame.

Figure 8:
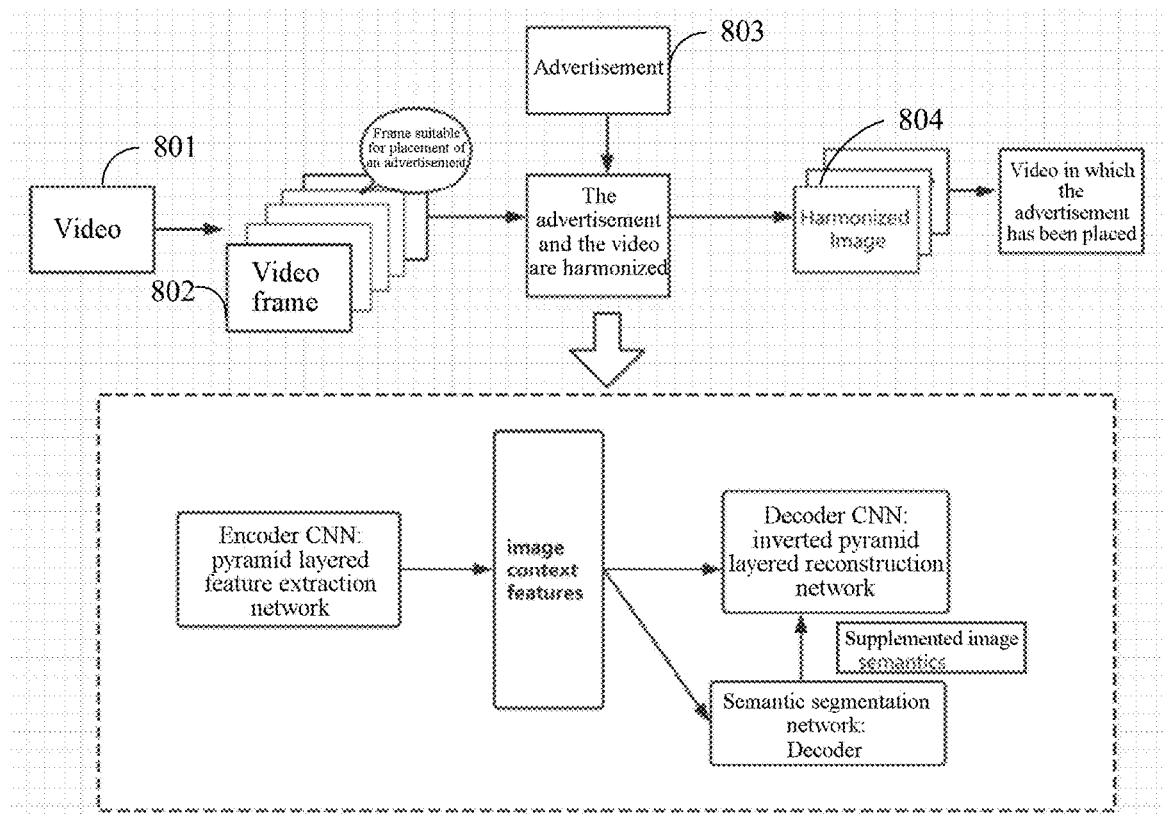
FIG. 8 is a schematic diagram showing an architecture of placing an advertisement into a video according to an embodiment of the present disclosure.

For example, referring to FIG. 8, an example in which an advertisement 803 is placed into the video 801 is used. The video 801 may be split into a plurality of video frames 802, and then a video frame 802 suitable for placement of an advertisement 803 is determined.

302: The image processing device harmonizes a promotional content image to a harmonized region of the target video frame, to obtain a harmonized video frame.

For example, referring to FIG. 8, the image processing device may harmonize an advertisement image 803 to the video frame 802 suitable for placement of an advertisement, to obtain the harmonized video frame 803.

303: The image processing device extracts image context features of the harmonized video frame by using an encoder in a semantic segmentation network.

For example, referring to FIG. 8, the image processing device may extract the image context features of the harmonized video frame by using an encoder CNN (which may be a pyramid layered feature extraction network). Image context features are context feature representations (representations in a vector form) of the image, and may be understood as overall structural information of the entire image and context semantic information of the image surrounding the replaced region.

Specifically, for context feature extraction of the encoder, refer to the description of the foregoing embodiments.

304: The image processing device performs semantic extraction on the image context features by using a decoder in a semantic segmentation network, to obtain multi-level semantic information.

For example, referring to FIG. 8, semantic extraction may be performed on the image context features by using the decoder in the semantic segmentation network, to obtain the multi-level semantic information. Specifically, for a process of the semantic extraction, refer to the foregoing related descriptions. For example, multi-level semantic extraction may be performed on a context feature outputted by the encoder, and extracted semantic information is harmonized with a middle-layer context feature at the same level, to obtain the multi-level semantic information. For example, refer to the process of semantic extraction shown in FIG. 4.

305: The image processing device performs image reconstruction by using the image reconstruction network based on the image context features and the multi-level semantic information, to obtain a reconstructed harmonized image.

For example, referring to FIG. 8, image reconstruction may be performed by using the image reconstruction network, for example, a decoder CNN (an inverted pyramid layered reconstruction network), to obtain a reconstructed harmonized video frame (harmonized image). Specifically, context features outputted by the encoder may be inputted into the image reconstruction network, and the image reconstruction network performs feature restoration on the context features with reference to the multi-level semantic information, to obtain a restored image.

Specifically, for a process of implementing the image reconstruction by the image reconstruction network, refer to the descriptions of the foregoing embodiments, for example, descriptions of FIG. 5 and FIG. 6.

In an embodiment, an image within a harmonized region in the reconstructed harmonized image may further be replaced with the original promotional content image. For example, an image within a harmonized region in a reconstructed video frame may be replaced with an original advertisement content image.

Figure 9:
FIG. 9 is a schematic diagram showing an image processing effect according to an embodiment of the present disclosure.

As can be learned from the above, by means of the solution provided in this embodiment of the present disclosure, promoted contents, for example, an advertisement, can be automatically and seamlessly pasted into a video without excessive manual participation. A video frame and a promoted content, for example, an advertisement content, are harmonized by using a deep learning encoder-decoder architecture, which makes the video frame and the promoted content fit better with each other. Referring to FIG. 9, the right part of the figure is an image having been processed by using the solution provided in this embodiment of the present disclosure and into which an advertisement has been harmonized, and the left part is an image into which an advertisement has been harmonized in a conventional harmonization manner. Obviously, the right part is more natural and harmonious than the left part in brightness, saturation, and color after the advertisements are harmonized.

In addition, to obtain more scenario semantic information in a model reconstruction process, a semantic extraction model is added, to supplement semantics to the image reconstruction process. By using these key technologies, adaptive adjustment of a promoted content, for example, an advertisement, when being placed into different video scenarios can be automatically implemented. According to differences between video frame images, image features such as texture, color, and brightness of the promoted content, for example, an advertisement, are automatically adjusted, thereby greatly saving labor costs, and laying a foundation for a large scale of automatic advertisement placement into videos. In addition, a style, a color, and the like of an advertisement content remain unchanged.

Herein, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

To better implement the foregoing method, correspondingly, an embodiment of the present disclosure further provides an image processing apparatus. The image processing apparatus may be integrated in a computer device, and the computer device may be a server, a terminal, or another image processing device having an image processing capability. For example, the terminal may be a mobile phone, a tablet computer, or a notebook computer.

Figure 10:
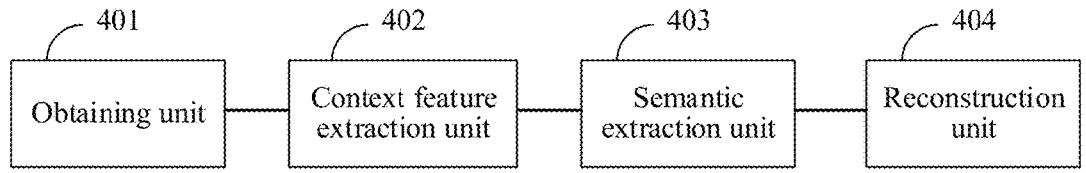
FIG. 10 is a schematic structural diagram of an object detection apparatus according to an embodiment of the present disclosure.

For example, as shown in FIG. 10, the image processing apparatus may include an obtaining unit 401, a context feature extraction unit 402, a semantic extraction unit 403, and a reconstruction unit 404.

The obtaining unit 401 is configured to obtain a harmonized image, the harmonized image being harmonized with a promotional content image.

The context feature extraction unit 402 is configured to perform context feature extraction on the harmonized image, to obtain context feature information of the harmonized image.

The semantic extraction unit 403 is configured to extract multi-level semantic information of an object in the harmonized image based on the context feature information.

The reconstruction unit 405 is configured to perform image reconstruction based on the context feature information and the multi-level semantic information, to obtain a reconstructed image.

In an embodiment, the context feature extraction unit 402 is configured to perform the context feature extraction on the harmonized image by using a plurality of convolutional layers in a first convolutional neural network, to obtain multi-layer context features of the harmonized image;
  the semantic extraction unit 403 is configured to extract the multi-level semantic information of the object in the harmonized image based on the multi-layer context features of the harmonized image; and
  the reconstruction unit 404 is configured to perform the image reconstruction based on the multi-layer context features and the multi-level semantic information, to obtain the reconstructed image.

In an embodiment, the semantic extraction unit 403 is specifically configured to: perform multi-level semantic extraction on the output-layer context feature, and harmonize extracted semantic information with a middle-layer context feature at the same level, to obtain the multi-level semantic information of the object in the harmonized image.

Figure 11:
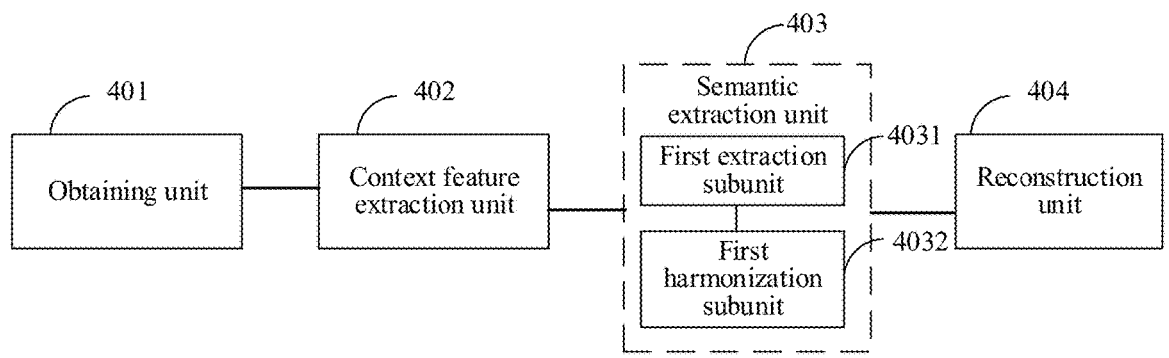
FIG. 11 is another schematic structural diagram of an object detection apparatus according to an embodiment of the present disclosure.

In an embodiment, referring to FIG. 11, the semantic extraction unit 403 includes:
  a first extraction subunit 4031, configured to determine the output-layer context feature as a current extraction feature, and perform semantic extraction on the current extraction feature, to obtain target-level semantic information of the object in the harmonized image; and
  a first harmonization subunit 4032, configured to harmonize the target-level semantic information with a middle-layer context feature at the same level, to obtain a target-level harmonized feature of the object in the harmonized image; update a current input feature to the target-level harmonized feature; and trigger, when a semantic extraction termination condition is not met (that is, in a case that a semantic extraction termination condition is not met), the first extraction subunit to perform the operation of performing semantic extraction on the current extraction feature; or output the multi-level semantic information of the object in the harmonized image when a semantic extraction termination condition is met (that is, in a case that a semantic extraction termination condition is met).

In an embodiment, the multi-layer context features include the output-layer context feature; and the reconstruction unit 404 is configured to: perform multi-level feature restoration on the output-layer context feature, and harmonize semantic information and a restored feature at the same level, to obtain the reconstructed image.

Figure 12:
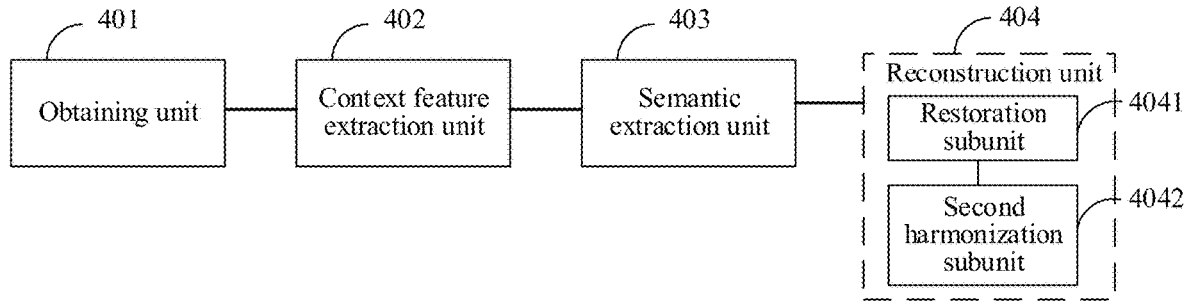
FIG. 12 is another schematic structural diagram of an object detection apparatus according to an embodiment of the present disclosure.

In an embodiment, the multi-layer context features include the output-layer context feature and intermediate context features of a plurality of levels. Referring to FIG. 12, the reconstruction unit 404 includes:

a restoration subunit 4041, configured to determine the output-layer context feature as a current restoration feature, and perform feature restoration on the current restoration feature, to obtain a restored feature; and a second harmonization subunit 4042, configured to: harmonize the restored feature and semantic information at the same level, to obtain a harmonized feature; update the current restoration feature to the harmonized feature; and return, when a reconstruction termination condition is not met (that is, in a case that a reconstruction termination condition is not met), to perform the operation of performing feature restoration on the current restoration feature; or output the current restoration feature when a reconstruction termination condition is met (that is, in a case that a reconstruction termination condition is met), to obtain the reconstructed image.

Figure 13:
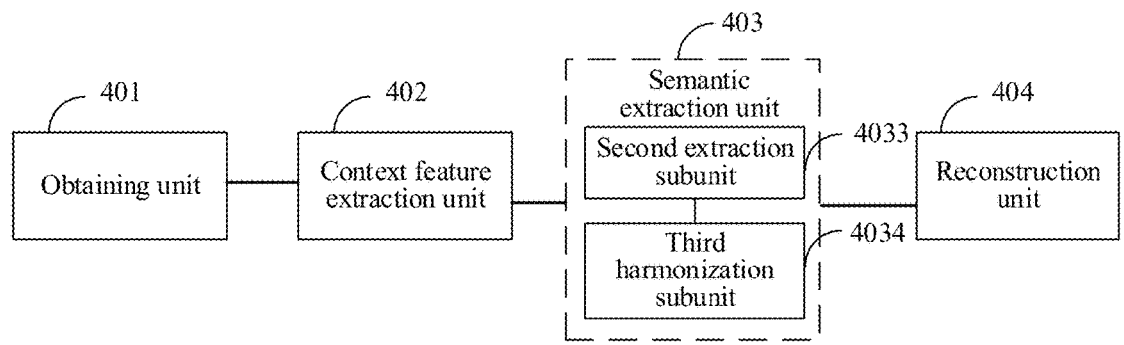
FIG. 13 is another schematic structural diagram of an object detection apparatus according to an embodiment of the present disclosure.

In an embodiment, the first convolutional neural network includes an encoding module and a decoding module, the encoding module including a plurality of encoding convolutional layers, and the decoding module including a plurality of decoding convolutional layers in skip connections with the plurality of encoding convolutional layers respectively;

referring to FIG. 13, the context feature extraction unit 402 is configured to perform the context feature extraction on the harmonized image by using the plurality of encoding convolutional layers in the encoding module; and the semantic extraction unit 403 includes:

a second extraction unit 4033, configured to: for any one of the plurality of decoding convolutional layers, perform, by using the decoding convolutional layer, semantic extraction on a feature outputted by a previous layer; and a third harmonization subunit 4034, configured to harmonize an extracted semantic feature and a middle-layer context feature at the same level, the middle-layer context feature at the same level being a middle-layer context feature outputted by an encoding convolutional layer in a skip connection with the decoding convolutional layer.

Figure 14:
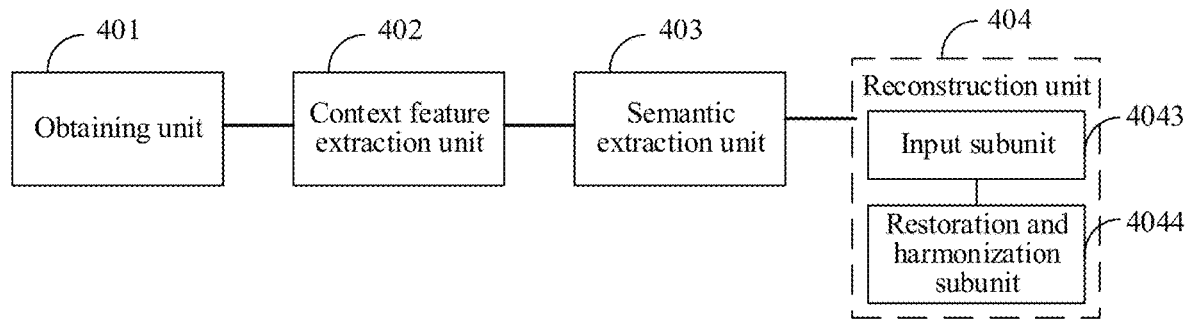
FIG. 14 is another schematic structural diagram of an object detection apparatus according to an embodiment of the present disclosure.

In an embodiment, referring to FIG. 14, the reconstruction unit 404 includes:

an input subunit 4043, configured to input the output-layer context feature into a second convolutional neural network, the second convolutional neural network including a plurality of convolutional layers; and a restoration and harmonization subunit 4044, configured to: perform, by using a convolutional layer in the second convolutional neural network, feature restoration on a feature outputted by a previous layer, harmonize a restored feature with semantic information at the same level, and input the harmonized feature into a next convolutional layer, to obtain the reconstructed image.

In an embodiment, the obtaining unit 401 is configured to: split a video, to obtain at least one video frame; determine a target video frame in the at least one video frame; harmonize the promotional content image to a harmonized region of the target video frame, to obtain a harmonized video frame; and use the harmonized video frame as the harmonized image.

Figure 15:
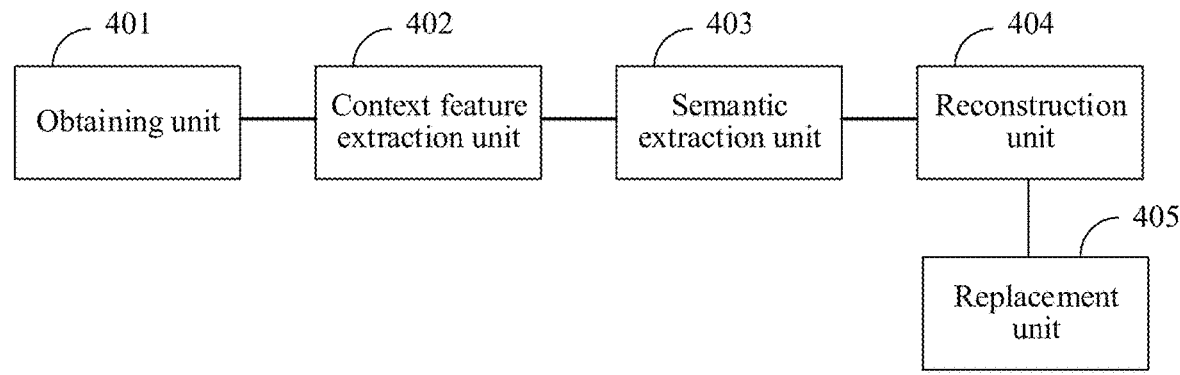
FIG. 15 is another schematic structural diagram of an object detection apparatus according to an embodiment of the present disclosure.

In an embodiment, referring to FIG. 15, the image processing apparatus in this embodiment of the present disclosure may further include a replacement unit 405, the replacement unit 405 being configured to: determine a harmonized region in the reconstructed image, and replace an image of the harmonized region in the reconstructed image with the promotional content image, to obtain an image after the replacement.

During specific implementations, the foregoing units may be implemented as independent entities, or may be randomly combined, or may be implemented as the same entity or several entities. For specific implementations of the foregoing units, refer to the foregoing method embodiments. Details refer to the embodiments described herein.

As can be learned from the above, the image processing apparatus in this embodiment may obtain a harmonized image by using the obtaining unit 401, the harmonized image being harmonized with a promotional content image; perform context feature extraction on the harmonized image by using the context feature extraction unit 402, to obtain context feature information of the harmonized image; extract multi-level semantic information of an object in the harmonized image by using the semantic extraction unit 403 based on the context feature information; and perform image reconstruction by using the reconstruction unit 405 based on the context feature information and the multi-level semantic information, to obtain a reconstructed image. By means of the solution, a harmonized image can be reconstructed based on context feature information and semantic information of the harmonized image, that is, the harmonized image can be readjusted, thereby greatly improving an image harmonization effect.

Figure 16:
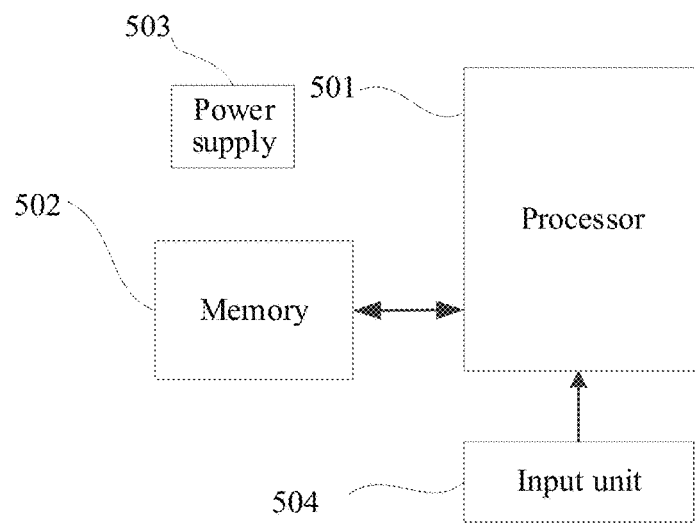
FIG. 16 is a schematic structural diagram of a network device according to an embodiment of the present disclosure.

In addition, an embodiment of the present disclosure further provides a computer device. FIG. 16 is a schematic structural diagram of computer devices according to an embodiment of the present disclosure. An example in which the computer device is a network device is used. Specifically:

The network device may include components such as a processor 501 including one or more processing cores, a memory 502 including one or more computer-readable storage media, a power supply 503, and an input unit 504. A person skilled in the art may understand that the structure of the network device shown in FIG. 16 does not constitute a limitation to the network device, and the network device may include more or fewer components than those shown in the figure, or some components may be combined, or a different component deployment may be used.

The processor 501 is a control center of the network device, and connects various parts of the entire network device by using various interfaces and lines. By running or executing software programs and/or modules stored in the memory 502, and invoking data stored in the memory 502, the processor 501 performs various functions and data processing of the network device, thereby performing overall monitoring on the network device. The processor 501 may include one or more processing cores. The processor 501 may integrate an application processor and a modem processor. The application processor mainly processes an operating system, a user interface, an application, and the like, and the modem processor mainly processes wireless communication. It may be understood that the modem processor may alternatively not be integrated into the processor 501.

The memory 502 may be configured to store a software program and a module, and the processor 501 runs the software program and the module that are stored in the memory 502, to implement various functional applications and data processing. The memory 502 may mainly include a program storage area and a data storage area. The program storage area may store an operating system, an application required by at least one function (such as a sound playing function and an image display function), and the like. The data storage area may store data created according to use of the network device, and the like. In addition, the memory 502 may include a high-speed random access memory, and may further include a non-volatile memory, such as at least one magnetic disk storage device, a flash memory, or another volatile solid-state storage device. Correspondingly, the memory 502 may further include a memory controller, to allow the processor 501 to access the memory 502.

The network device further includes the power supply 503 for supplying power to the components. The power supply 503 may be logically connected to the processor 501 by using a power management system, thereby implementing functions such as charging, discharging, and power consumption management by using the power management system. The power supply 503 may further include one or more of a direct current or alternating current power supply, a re-charging system, a power failure detection circuit, a power supply converter or inverter, a power supply state indicator, and any other component.

The network device may further include the input unit 504. The input unit 504 may be configured to receive inputted digit or character information and generate keyboard, mouse, joystick, optical, or trackball signal input related to user settings and function control.

Although not shown in the figure, the network device may further include a display unit, and the like. Details refer to the embodiments described herein. Specifically, in this embodiment, the processor 501 in the network device may load executable files corresponding to processes of one or more applications to the memory 502 according to the following instructions, and the processor 501 runs the applications stored in the memory 502 to implement the following various functions:

obtaining a harmonized image, the harmonized image being harmonized with a promotional content image; performing context feature extraction on the harmonized image, to obtain context feature information of the harmonized image; extracting multi-level semantic information of an object in the harmonized image based on the context feature information; and performing image reconstruction based on the context feature information and the multi-level semantic information, to obtain a reconstructed image.

In some embodiments, the processor 501 of the network device is configured to perform the following steps:
performing the context feature extraction on the harmonized image by using a plurality of convolutional layers in a first convolutional neural network, to obtain multi-layer context features of the harmonized image;
extracting the multi-level semantic information of the object in the harmonized image based on the multi-layer context features of the harmonized image; and
performing the image reconstruction based on the multi-layer context features and the multi-level semantic information, to obtain the reconstructed image.

In some embodiments, the multi-layer context features include an output-layer context feature and a middle-layer context feature; and the processor 501 of the network device is configured to perform the following steps:
performing multi-level semantic extraction on the output-layer context feature, and harmonizing extracted semantic information with a middle-layer context feature at the same level, to obtain the multi-level semantic information of the object in the harmonized image.

In some embodiments, the processor 501 of the network device is configured to perform the following steps:
determining the output-layer context feature as a current extraction feature;
performing semantic extraction on the current extraction feature, to obtain target-level semantic information of the object in the harmonized image;
harmonizing the target-level semantic information with a middle-layer context feature at the same level, to obtain a target-level harmonized feature of the object in the harmonized image;
updating a current input feature to the target-level harmonized feature; and
returning, in a case that a semantic extraction termination condition is not met, to perform the operation of performing semantic extraction on the current extraction feature; or
outputting the multi-level semantic information of the object in the harmonized image in a case that a semantic extraction termination condition is met.

In some embodiments, the multi-layer context features include the output-layer context feature; and the processor 501 of the network device is configured to perform the following steps:
performing multi-level feature restoration on the output-layer context feature, and harmonizing semantic information and a restored feature at the same level, to obtain the reconstructed image.

In some embodiments, the multi-layer context features include the output-layer context feature and intermediate context features of a plurality of levels; and the processor 501 of the network device is configured to perform the following steps:
determining the output-layer context feature as a current restoration feature;
performing feature restoration on the current restoration feature, to obtain a restored feature;
harmonizing the restored feature and semantic information at the same level, to obtain a harmonized feature;
updating the current restoration feature to the harmonized feature; and
returning, in a case that a reconstruction termination condition is not met, to perform the operation of performing feature restoration on the current restoration feature; or
outputting the current restoration feature in a case that a reconstruction termination condition is met, to obtain the reconstructed image.

In some embodiments, the first convolutional neural network includes an encoding module and a decoding module, the encoding module including a plurality of encoding convolutional layers, and the decoding module including a plurality of decoding convolutional layers in skip connections with the plurality of encoding convolutional layers respectively; and
the processor 501 of the network device is configured to perform the following steps:
performing the context feature extraction on the harmonized image by using the plurality of encoding convolutional layers in the encoding module;

for any one of the plurality of decoding convolutional layers, performing, by using the decoding convolutional layer, semantic extraction on a feature outputted by a previous layer; and harmonizing an extracted semantic feature and a middle-layer context feature at the same level, the middle-layer context feature at the same level being a middle-layer context feature outputted by an encoding convolutional layer in a skip connection with the decoding convolutional layer.

In some embodiments, the processor 501 of the network device is configured to perform the following steps:

inputting the output-layer context feature into a second convolutional neural network, the second convolutional neural network including a plurality of convolutional layers; and performing, by using a convolutional layer in the second convolutional neural network, feature restoration on a feature outputted by a previous layer, harmonizing a restored feature with semantic information at the same level, and inputting the harmonized feature into a next convolutional layer, to obtain the reconstructed image.

In some embodiments, the processor 501 of the network device is configured to perform the following steps:

splitting a video, to obtain at least one video frame;

determining a target video frame in the at least one video frame;

harmonizing the promotional content image to a harmonized region of the target video frame, to obtain a harmonized video frame; and using the harmonized video frame as the harmonized image.

In some embodiments, the processor 501 of the network device is further configured to perform the following steps:

determining a harmonized region in the reconstructed image; and replacing an image of the harmonized region in the reconstructed image with the promotional content image, to obtain an image after the replacement.

For specific implementations of the above operations, refer to the foregoing embodiments. Details refer to the embodiments described herein.

As can be learned from the above, the computer device in this embodiment obtains a harmonized image, the harmonized image being harmonized with a promotional content image; performs context feature extraction on the harmonized image, to obtain context feature information of the harmonized image; extracts multi-level semantic information of an object in the harmonized image based on the context feature information; and performs image reconstruction based on the context feature information and the multi-level semantic information, to obtain a reconstructed image. By means of the solution, a harmonized image can be reconstructed based on context feature information and semantic information of the harmonized image, that is, the harmonized image can be readjusted, thereby greatly improving an image harmonization effect.

A person of ordinary skill in the art may understand that, all or some steps of the methods in the foregoing embodiments may be implemented by using instructions, or implemented through instructions controlling relevant hardware, and the instructions may be stored in a computer-readable storage medium and loaded and executed by a processor.

Accordingly, an embodiment of the present disclosure further provides a storage medium, storing a plurality of instructions. The instructions can be loaded by the processor to perform the steps in any image processing method according to the embodiments of the present disclosure. For example, the instructions may perform the following steps:

obtaining a harmonized image, the harmonized image being harmonized with a promotional content image; performing context feature extraction on the harmonized image, to obtain context feature information of the harmonized image; extracting multi-level semantic information of an object in the harmonized image based on the context feature information; and performing image reconstruction based on the context feature information and the multi-level semantic information, to obtain a reconstructed image.

In some embodiments, the instructions stored in the storage medium can be loaded by the processor to perform the following steps:

performing the context feature extraction on the harmonized image by using a plurality of convolutional layers in a first convolutional neural network, to obtain multi-layer context features of the harmonized image;

extracting the multi-level semantic information of the object in the harmonized image based on the multi-layer context features of the harmonized image; and performing the image reconstruction based on the multi-layer context features and the multi-level semantic information, to obtain the reconstructed image.

In some embodiments, the multi-layer context features include an output-layer context feature and a middle-layer context feature; and the instructions stored in the storage medium can be loaded by the processor to perform the following steps:

performing multi-level semantic extraction on the output-layer context feature, and harmonizing extracted semantic information with a middle-layer context feature at the same level, to obtain the multi-level semantic information of the object in the harmonized image.

In some embodiments, the instructions stored in the storage medium can be loaded by the processor to perform the following steps:

determining the output-layer context feature as a current extraction feature;

performing semantic extraction on the current extraction feature, to obtain target-level semantic information of the object in the harmonized image;

harmonizing the target-level semantic information with a middle-layer context feature at the same level, to obtain a target-level harmonized feature of the object in the harmonized image;

updating a current input feature to the target-level harmonized feature; and returning, in a case that a semantic extraction termination condition is not met, to perform the operation of performing semantic extraction on the current extraction feature; or outputting the multi-level semantic information of the object in the harmonized image in a case that a semantic extraction termination condition is met.

In some embodiments, the multi-layer context features include the output-layer context feature; and the instructions stored in the storage medium can be loaded by the processor to perform the following steps:

performing multi-level feature restoration on the output-layer context feature, and harmonizing semantic information and a restored feature at the same level, to obtain the reconstructed image.

In some embodiments, the multi-layer context features include the output-layer context feature and intermediate context features of a plurality of levels; and the instructions stored in the storage medium can be loaded by the processor to perform the following steps:

determining the output-layer context feature as a current restoration feature;

performing feature restoration on the current restoration feature, to obtain a restored feature;

harmonizing the restored feature and semantic information at the same level, to obtain a harmonized feature;

updating the current restoration feature to the harmonized feature; and returning, in a case that a reconstruction termination condition is not met, to perform the operation of performing feature restoration on the current restoration feature; or outputting the current restoration feature in a case that a reconstruction termination condition is met, to obtain the reconstructed image.

In some embodiments, the first convolutional neural network includes an encoding module and a decoding module, the encoding module including a plurality of encoding convolutional layers, and the decoding module including a plurality of decoding convolutional layers in skip connections with the plurality of encoding convolutional layers respectively; and the instructions stored in the storage medium can be loaded by the processor to perform the following steps:

performing the context feature extraction on the harmonized image by using the plurality of encoding convolutional layers in the encoding module;

for any one of the plurality of decoding convolutional layers, performing, by using the decoding convolutional layer, semantic extraction on a feature outputted by a previous layer; and harmonizing an extracted semantic feature and a middle-layer context feature at the same level, the middle-layer context feature at the same level being a middle-layer context feature outputted by an encoding convolutional layer in a skip connection with the decoding convolutional layer.

In some embodiments, the instructions stored in the storage medium can be loaded by the processor to perform the following steps:

inputting the output-layer context feature into a second convolutional neural network, the second convolutional neural network including a plurality of convolutional layers; and performing, by using a convolutional layer in the second convolutional neural network, feature restoration on a feature outputted by a previous layer, harmonizing a restored feature with semantic information at the same level, and inputting the harmonized feature into a next convolutional layer, to obtain the reconstructed image.

In some embodiments, the instructions stored in the storage medium can be loaded by the processor to perform the following steps:

splitting a video, to obtain at least one video frame;

determining a target video frame in the at least one video frame;

harmonizing the promotional content image to a harmonized region of the target video frame, to obtain a harmonized video frame; and using the harmonized video frame as the harmonized image.

In some embodiments, the instructions stored in the storage medium can be loaded by the processor to perform the following steps:

determining a harmonized region in the reconstructed image; and replacing an image of the harmonized region in the reconstructed image with the promotional content image, to obtain an image after the replacement.

For specific implementations of the above operations, refer to the foregoing embodiments. Details refer to the embodiments described herein.

The storage medium may include a read-only memory (ROM), a random access memory (RAM), a magnetic disk, an optical disc, or the like.

Because the instructions stored in the storage medium may perform the steps of any image processing method provided in the embodiments of the present disclosure, the instructions can implement beneficial effects that can be implemented by any image processing method provided in the embodiments of the present disclosure. For details, refer to the foregoing embodiments. Details refer to the embodiments described herein.

In some embodiments, a computer program product including instructions is further provided, the computer program product, when run on a computer, causing the computer to perform any possible implementation in the image processing method provided in the foregoing embodiments. Details refer to the embodiments described herein.

The image processing method and apparatus, the computer device, and the storage medium provided in the embodiments of the present disclosure are described above in detail. Although the principles and implementations of the present disclosure are described by using specific examples in this specification, the descriptions of the foregoing embodiments are merely intended to help understand the method and the core idea of the present disclosure. Meanwhile, a person skilled in the art may make modifications to the specific implementations and application range according to the idea of the present disclosure. In conclusion, the content of this specification is not to be construed as a limitation to the present disclosure.

What is claimed is:

1. An image processing method, comprising:

obtaining a harmonized image, the harmonized image being harmonized with a promotional content image;

performing context feature extraction on the harmonized image using a plurality of convolutional layers in a first convolutional neural network, to obtain multi-layer context features of the harmonized image, the multi-layer context features comprise an output-layer context feature and a middle-layer context feature;

performing multi-level semantic extraction on the output-layer context feature to obtain an intermediate multi-level semantic information of an object in the harmonized image;

harmonizing the intermediate multi-level semantic information with a middle-layer context feature at a same level in a manner of feature value summation, to obtain the multi-level semantic information of the object in the harmonized image; and performing image reconstruction based on the multi-layer context features and the multi-level semantic information, to obtain a reconstructed image.

2. The image processing method of claim 1, wherein the performing the multi-level semantic extraction on the output-layer context feature comprises:

determining the output-layer context feature as a current extraction feature;

performing semantic extraction on the current extraction feature, to obtain target-level semantic information of the object in the harmonized image;

harmonizing the target-level semantic information with a middle-layer context feature at a same level, to obtain a target-level harmonized feature of the object in the harmonized image;

updating a current input feature to the target-level harmonized feature; and in response to a semantic extraction termination condition being met, outputting the multi-level semantic information of the object in the harmonized image.

3. The image processing method of claim 2, wherein the performing the multi-level semantic extraction on the output-layer context feature comprises:

in response to the semantic extraction termination condition being not met, reperforming the semantic extraction on the current extraction feature.

4. The image processing method of claim 2, wherein the multi-layer context features comprise the output-layer context feature; and the performing the image reconstruction based on the multi-layer context features and the multi-level semantic information, to obtain the reconstructed image comprises:

performing multi-level feature restoration on the output-layer context feature to obtain a restored feature; and harmonizing the restored feature and semantic information at a same level, to obtain the reconstructed image.

5. The image processing method of claim 4, wherein the multi-layer context features comprise the output-layer context feature and intermediate context features with a plurality of levels, and the performing the image reconstruction based on the multi-layer context features and the multi-level semantic information, to obtain the reconstructed image comprises:

determining the output-layer context feature as a current restoration feature;

performing feature restoration on the current restoration feature, to obtain a restored feature;

harmonizing the restored feature and semantic information at a same level, to obtain a harmonized feature;

updating the current restoration feature to the harmonized feature; and in response to a reconstruction termination condition being met, outputting the current restoration feature to obtain the reconstructed image.

6. The image processing method of claim 5, wherein the performing the image reconstruction based on the multi-layer context features and the multi-level semantic information, to obtain the reconstructed image comprises:

in response to a reconstruction termination condition being not met, reperforming the feature restoration on the current restoration feature.

7. The image processing method of claim 4, wherein the performing the image reconstruction based on the multi-layer context features and the multi-level semantic information, to obtain the reconstructed image comprises:

inputting the output-layer context feature into a second convolutional neural network, the second convolutional neural network comprising a plurality of convolutional layers;

performing feature restoration on a feature outputted by a previous convolutional layer using a convolutional layer in the second convolutional neural network, to obtain a restored feature;

harmonizing the restored feature with semantic information at a same level, and inputting the harmonized feature into a next convolutional layer to obtain the reconstructed image.

8. The image processing method of claim 1, wherein the first convolutional neural network comprises an encoding module and a decoding module, the encoding module comprising a plurality of encoding convolutional layers, and the decoding module comprising a plurality of decoding convolutional layers in skip connections with the plurality of encoding convolutional layers respectively;

the performing the context feature extraction on the harmonized image using the plurality of convolutional layers in the first convolutional neural network comprises:

performing the context feature extraction on the harmonized image using the plurality of encoding convolutional layers in the encoding module; and the extracting the multi-level semantic information of the object in the harmonized image based on the multi-layer context features of the harmonized image comprises:

for each of the plurality of decoding convolutional layers, performing semantic extraction on a feature outputted by a previous convolutional layer using the decoding convolutional layer; and harmonizing an extracted semantic feature and a middle-layer context feature at a same level, the middle-layer context feature at the same level being a middle-layer context feature outputted by an encoding convolutional layer in a skip connection with the decoding convolutional layer.

9. The image processing method of claim 1, wherein the obtaining a harmonized image comprises:

splitting a video to obtain at least one video frame;

determining a target video frame in the at least one video frame;

harmonizing the promotional content image to a harmonized region of the target video frame, to obtain a harmonized video frame; and using the harmonized video frame as the harmonized image.

10. The image processing method of claim 1, further comprising:

determining a harmonized region in the reconstructed image; and replacing an image of the harmonized region in the reconstructed image with the promotional content image.

11. An image processing apparatus, comprising:

a memory operable to store computer-readable instructions; and a processor operable to read the computer-readable instructions, the processor when executing the computer-readable instructions is configured to:

obtain a harmonized image, the harmonized image being harmonized with a promotional content image;

perform context feature extraction on the harmonized image using a plurality of convolutional layers in a first convolutional neural network, to obtain multi-layer context features of the harmonized image, the multi-layer context features comprise an output-layer context feature and a middle-layer context feature;

perform multi-level semantic extraction on the output-layer context feature to obtain an intermediate multi-level semantic information of an object in the harmonized image;

harmonize the intermediate multi-level semantic information with a middle-layer context feature at a same level in a manner of feature value summation, to obtain the multi-level semantic information of the object in the harmonized image;

perform image reconstruction based on the multi-layer context features and the multi-level semantic information, to obtain a reconstructed image.

12. The image processing apparatus of claim 11, wherein the processor is configured to:

perform the context feature extraction on the harmonized image using a plurality of convolutional layers in a first convolutional neural network, to obtain multi-layer context features of the harmonized image;

extract the multi-level semantic information of the object in the harmonized image based on the multi-layer context features of the harmonized image; and perform the image reconstruction based on the multi-layer context features and the multi-level semantic information, to obtain the reconstructed image.

13. The image processing apparatus of claim 12, wherein the multi-layer context features comprise an output-layer context feature and a middle-layer context feature, and the processor is configured to:

perform multi-level semantic extraction on the output-layer context feature to obtain an intermediate multi-level semantic information; and harmonize the intermediate multi-level semantic information with a middle-layer context feature at a same level, to obtain the multi-level semantic information of the object in the harmonized image.

14. The image processing apparatus of claim 13, wherein the processor is configured to:

determine the output-layer context feature as a current extraction feature;

perform semantic extraction on the current extraction feature, to obtain target-level semantic information of the object in the harmonized image;

harmonize the target-level semantic information with a middle-layer context feature at a same level, to obtain a target-level harmonized feature of the object in the harmonized image;

update a current input feature to the target-level harmonized feature; and in response to a semantic extraction termination condition being met, output the multi-level semantic information of the object in the harmonized image.

15. The image processing apparatus of claim 14, wherein the processor is configured to:

in response to the semantic extraction termination condition being not met, reperform the semantic extraction on the current extraction feature.

16. The image processing apparatus of claim 14, wherein the multi-layer context features comprise the output-layer context feature, and the processor is configured to:

perform multi-level feature restoration on the output-layer context feature to obtain a restored feature; and harmonize the restored feature and semantic information at a same level, to obtain the reconstructed image.

17. The image processing apparatus of claim 16, wherein the multi-layer context features comprise the output-layer context feature and intermediate context features with a plurality of layers, and the processor is configured to:

determine the output-layer context feature as a current restoration feature;

perform feature restoration on the current restoration feature, to obtain a restored feature;

harmonize the restored feature and semantic information at a same level, to obtain a harmonized feature;

update the current restoration feature to the harmonized feature; and in response to a reconstruction termination condition being met, output the current restoration feature to obtain the reconstructed image.

18. A non-transitory computer-readable storage medium, having processor executable instructions stored thereon for causing a processor to:

obtain a harmonized image, the harmonized image being harmonized with a promotional content image;

perform context feature extraction on the harmonized image using a plurality of convolutional layers in a first convolutional neural network, to obtain multi-layer context features of the harmonized image, the multi-layer context features comprise an output-layer context feature and a middle-layer context feature;

perform multi-level semantic extraction on the output-layer context feature to obtain an intermediate multi-level semantic information of an object in the harmonized image;

harmonize the intermediate multi-level semantic information with a middle-layer context feature at a same level in a manner of feature value summation, to obtain the multi-level semantic information of the object in the harmonized image; and perform image reconstruction based on the multi-layer context features and the multi-level semantic information, to obtain a reconstructed image.

* * * * *